United States Patent
Schneider et al.

[11] Patent Number: 6,012,776
[45] Date of Patent: Jan. 11, 2000

[54] REVERSIBLE SEAT BACK FOR A BENCH SEAT

[75] Inventors: Ulrich Schneider, Isen; Markus Grave, Meisbach, both of Germany

[73] Assignee: Lear Corporation, Southfield, Mich.

[21] Appl. No.: 09/154,558

[22] Filed: Sep. 16, 1998

[30] Foreign Application Priority Data

Sep. 16, 1997 [DE] Germany .......................... 197 40 776

[51] Int. Cl.$^7$ ........................................................ B60N 2/22
[52] U.S. Cl. .................. 297/378.12; 297/364; 296/65.17
[58] Field of Search ............................ 297/378.1, 378.12, 297/364, 238; 296/69, 66, 65.16, 65.17

[56] References Cited

U.S. PATENT DOCUMENTS

| | | | |
|---|---|---|---|
| 5,246,272 | 9/1993 | Kato et al. .............................. | 297/364 |
| 5,603,550 | 2/1997 | Holdampf et al. ................. | 297/378.12 |
| 5,868,450 | 2/1999 | Hashimoto ................................ | 296/69 |
| 5,871,255 | 2/1999 | Harland et al. ........................... | 296/69 |

*Primary Examiner*—Anthony D. Barfield
*Attorney, Agent, or Firm*—Brooks & Kushman PC

[57] ABSTRACT

A reversible back for a bench seat is disclosed, in particular a back for the rear seat of a vehicle, such that parts of the back can be folded down into a flat transport position and returned to an upright seat position individually and independently of one another. A middle seat-back part (10) is provided, which can selectively be folded down either together with one or both of the laterally adjacent, outer seat-back parts (12, 14) or by itself, independently of the two outer seat-back parts (12, 14), as desired. The middle seat-back part (10) can be locked to each of the two outer parts (12, 14) individually. A central actuating mechanism (20) is provided in the middle seat-back part (10) so that the locking mechanisms (16, 18) on the two sides thereof can be jointly and simultaneously disengaged or engaged.

17 Claims, 11 Drawing Sheets

REVERSIBLE SEAT BACK FOR A BENCH SEAT

DESCRIPTION

The invention relates a reversible seat back or a hinged back for a bench seat, in particular for the back seat of a vehicle, wherein parts of the back can be tilted individually and independently of one another between an upright seat position and a flat transport position.

Known reversible or hinged seat backs of this kind are constructed in various forms and serve to allow the seat back to be tilted forward when it is necessary to enlarge the cargo space of a vehicle, in particular a vehicle having a back door.

In simple forms the seat back is tilted forward as a whole, in a single piece, in order to enlarge the cargo space. These have the disadvantage that no seating for a person is then available in the rear of the vehicle. For this reason, rear seat backs have already been modified by splitting them vertically so as to divide them into two parts, each of which can then be folded down, separately and independently of the other part, into a flat transport position. For this purpose, each individual part of the seat back has its own locking mechanism, provided in the region of the vehicle outer side of the vehicle body. In the interior of the vehicle, the two seat-back parts are abutting to each other when in the upright position but there is no special means of fixing them in that position. Accordingly, the frames of the two seat-back parts must be particularly robust and stress-resistant, so that in a crash situation the items of luggage behind the seat back are effectively prevented from pushing the seat back forward, i.e. into the passenger space, and possibly injuring the rear passengers.

Furthermore, it is often the case that only one particularly long item is to be transported in the vehicle, while at the same time as much seating space as possible is needed. This requirement cannot practicably be met if the seat back is divided only in the middle, so that when one part is folded down into the transport position little space is left for passengers.

The object of the invention is to disclose a reversible or hinged seat back of the kind described above that offers particularly versatile possibilities of employment but simultaneously provides a high degree of stability and safety when in the upright, seat position.

This object is achieved in accordance with the invention by constructing a reversible seat back of the kind described above in such a way that a middle part is provided, which can selectively be folded down either together with one or both of the laterally adjacent outer parts of the seat back or by itself, independently of the two outer parts; that the middle seat-back part can be locked at its sides to each of the two outer parts individually; and that the middle part comprises a central actuating mechanism by means of which both of the locking devices at its sides can be released or engaged jointly and simultaneously.

With the seat back in accordance with the invention this object is satisfactorily achieved. The user can choose among several configurations, depending on the transport situation, because the entire seat back, the right and middle parts, the left and middle parts, or only the middle part can be folded forward into the flat transport position.

It is possible to make the middle seat-back part considerably narrower than the two laterally adjacent outer seat-back parts, with the consequence that in the middle region a particularly long item of freight can be carried while leaving sufficient space for passengers to sit in considerable comfort. In the upright position the parts of the seat back are locked to one another in a pairwise manner, so that especially high stability and safety for a crash situation are advantageously obtained.

In a further development of the seat back in accordance with the invention, the actuating mechanism comprises a pair of locking bolts that in the locked position are biassed to complementary bolt retainers in the two outer seat-back parts to provide a form-fitting engagement, as well as an unlocking operating cable with which both locking bolts can be pulled simultaneously out of the bolt retainers. These features ensure a secure mutual immobilization of the seat-back parts in the seat position. At the same time, the actuating mechanism can be operated in a simple manner by means of the unlocking operating cable, in order to release the middle seat-back part.

It is particularly advantageous for each locking bolt to be provided with a head having a cross section that is not round, which in the locked position is in form-fitting engagement with a wall of the associated bolt retainer. By this means, in a crash situation the locking bolt can be reliably prevented from sliding out of its retainer and thereby unintentionally unlocking the middle seat-back part.

In a further development of the seat back in accordance with the invention the actuating mechanism is provided with a first pair of compression springs, which bias the locking bolts outward toward the locked position, as well as a turning device that turns the locking bolts through a predetermined angle of rotation to bring them into a rotationally locked position. These features contribute to moving the locking bolts reliably into their locked position, in which they engage with the bolt retainers, and holding them there.

In a special embodiment of the seat back in accordance with the invention, the turning device comprises a second pair of springs, preferably torsion springs, that apply torque on the locking bolts and bias the locking bolts around the longitudinal axis thereof toward their rotationally locked position.

In another special embodiment of the seat back in accordance with the invention, the turning device comprises a cross-pin on each locking bolt and an associated gate with an angled guide track for the cross-pin, such that as the locking bolt slides outward into the locked position, its movement is first translation and then rotation into the rotationally locked position. The gate thus ensures that movement of the locking bolt will be so constrained that its head is forced to rotate into form-fitting engagement with the bolt retainer.

In a further development of the seat back in accordance with the invention a guide tube is provided, which accommodates the two locking bolts as well as the compression springs associated therewith, the guide tube being supported in bearings so that it cannot be translationally displaced but can be turned through a predetermined angle of rotation. These features ensure a faultless guidance of the locking bolts and of the compression springs that bias them toward the locked position.

In yet another development of the seat back in accordance with the invention the unlocking operating cable comprises a central pull-strap to which is attached a traction cable for each locking bolt, such that when the strap is pulled, the effect is first to rotate the head of each locking bolt out of its rotationally locked position and then to withdraw each locking bolt from its bolt retainer.

These measures ensure that an unintended release of the locking mechanism is avoided, because it is necessary first to carefully disengage the locking bolts from their rotationally locked position and subsequently to pull the locking bolts out, in order to achieve a complete unlocking of the middle part of the seat back.

In a further development of the seat back in accordance with the invention, the guide tube comprises a guide track for a guide pin on each locking bolt, so that when mounted in the guide tube the locking bolt can be displaced axially along the tube but not rotated radially within it. As a result, faultless guidance of the locking bolt during locking and unlocking is guaranteed.

It is especially advantageous for the guide tube to be provided in its interior with deflection elements and associated openings in the wall of the guide tube through which the associated traction cable passes, such that beginning at the locking bolt the traction cable first runs substantially axially inside the tube and then turns so as to emerge radially from the guide tube, and in the rotationally locked position curves at least partially around the circumference of the guide tube before reaching the pull-strap.

By these measures, the traction cables are disposed so as to be protected in the interior of the guide tube. At the same time, when the pull-strap is pulled and tension is thus applied to the traction cables, it is ensured that the guide tube and hence the locking bolts will be rotated, so that the heads of the locking bolts will be moved out of the rotationally locked position.

In a further development of the seat back in accordance with the invention, the guide tube comprises a projection directed radially outward as well as two associated stops, spaced apart circumferentially, which limit the angle of rotation of the guide tube and simultaneously define the final positions of each locking bolt when it is in the locked and in the unlocked state, respectively. Regardless of how much pulling force is applied to the traction cables, the guide tube moves into a well defined final abutment position that enables reliable unlocking of the locking bolts. If no pulling force is applied to the traction cables, the guide tube occupies its second final abutment position, in which the bolts are in the locked state.

In a further development of the seat back in accordance with the invention, there is associated with the outer end of each locking bolt a stationary plate in which is an aperture, the shape of which is complementary to the shape of the head of the locking bolt and which receives the bolt head, preferably in such a way that the latter cannot rotate, when the bolt is in the unlocked position. This feature ensures that when the middle seat-back part is unlocked, the head of the locking bolt does not project outward but instead is protected within the associated plate, which advantageously constitutes a side end surface of the middle part of the seat back.

In a further development of the seat back in accordance with the invention, there is associated with the outer end of each locking bolt a detention mechanism that keeps the locking bolt in its retracted, unlocked position until the associated bolt retainer in the adjacent outer seat-back part is directly opposite the locking bolt.

In this way it is ensured that the locking bolt is reliably kept in the retracted, unlocked position even when the pull-strap and hence the traction cable are released. On the one hand, this avoids an unintended emergence of the locking bolt and on the other hand it allows a laterally adjacent, outer part of the seat back to be folded into the flat transport position. When the other outer seat-back part is aligned with the middle part on its other side, the locking bolt disposed there is not fixed in place by the detention mechanism and can therefore return to its locked position when the pull-strap and the traction cable are released. As a result, this second outer seat-back part and the middle part are reliably locked together.

In a further development of the seat back in accordance with the invention, the detention mechanism constitutes a securing device disposed transverse to the locking bolt, which is biassed toward its detention position in a direction transverse to the locking bolt, as well as a movable control peg in order to activate the securing device into the detention position and to disengage it to its resting position, respectively.

In such an embodiment it proves advantageous for the locking bolt to comprise a stop, spaced apart from the head along the locking bolt axis, which can be brought into engagement with a radial projection of the securing device so as to achieve detention. This measure makes available an especially effective detention, which by means of form-fitting engagement can hold the locking bolt firmly or release it.

In a further development of the seat back in accordance with the invention, the control peg can be displaced longitudinally within certain limits but is non-rotatably mounted, and comprises an inclined control surface to activate and pull back the securing device, respectively. With such a sliding displacement of the control peg, the securing device can be activated or uncoupled in a simple manner.

It is especially advantageous for each bolt retainer in the seat back in accordance with the invention to be provided with a control body associated with the control peg, such that when the control body is in a first relative position it actuates the control peg so as to disengage the securing device, and when in a second relative position releases the control peg to activate the securing device. Depending on the position of the bolt retainer relative to the locking bolt, therefore, it is ensured that the securing device will be either disengaged or activated.

In a further development of the seat back in accordance with the invention, each bolt retainer is constructed as a rotary latch mechanism, in which between the latch and pawl an aperture is formed, the contour of which is complementary to that of the head of the locking bolt. These features on one hand ensure that the locking bolt is accurately guided into the locked position and securely held there. On the other hand, they allow a laterally adjacent, outer seat-back part to be folded down into a flat transport position even if the actuating mechanism of the middle seat-back part is not operating.

In the following the invention is explained, also with respect to additional characteristics and advantages, by the description exemplary embodiments and with reference to the attached drawings, wherein.

Figure 1:
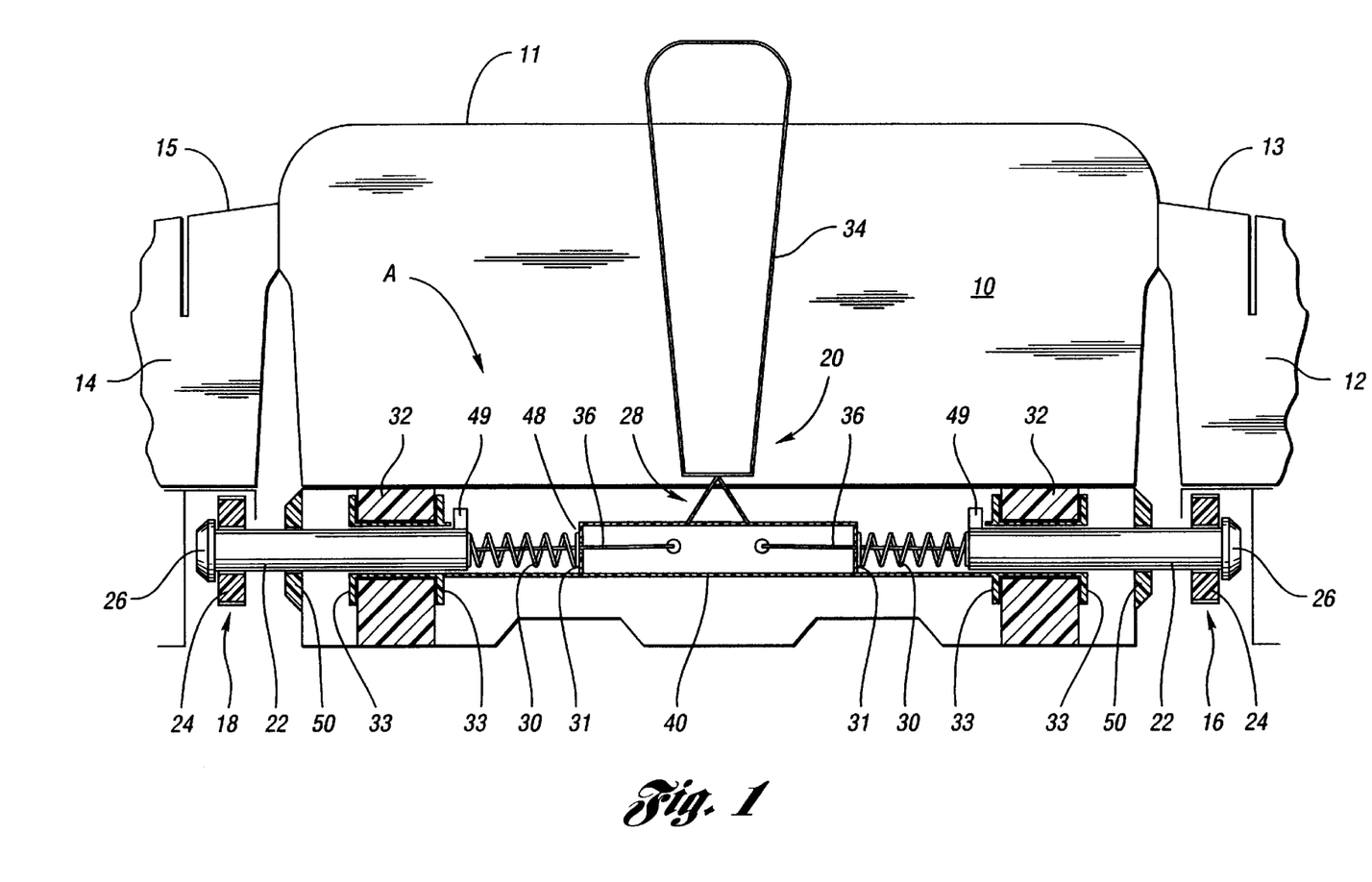
FIG. 1 is a schematic drawing of the reversible seat back in accordance with the invention in cross section, wherein the locking bolts have been put into their rotationally locked position in the bolt retainers.
Figure 2:
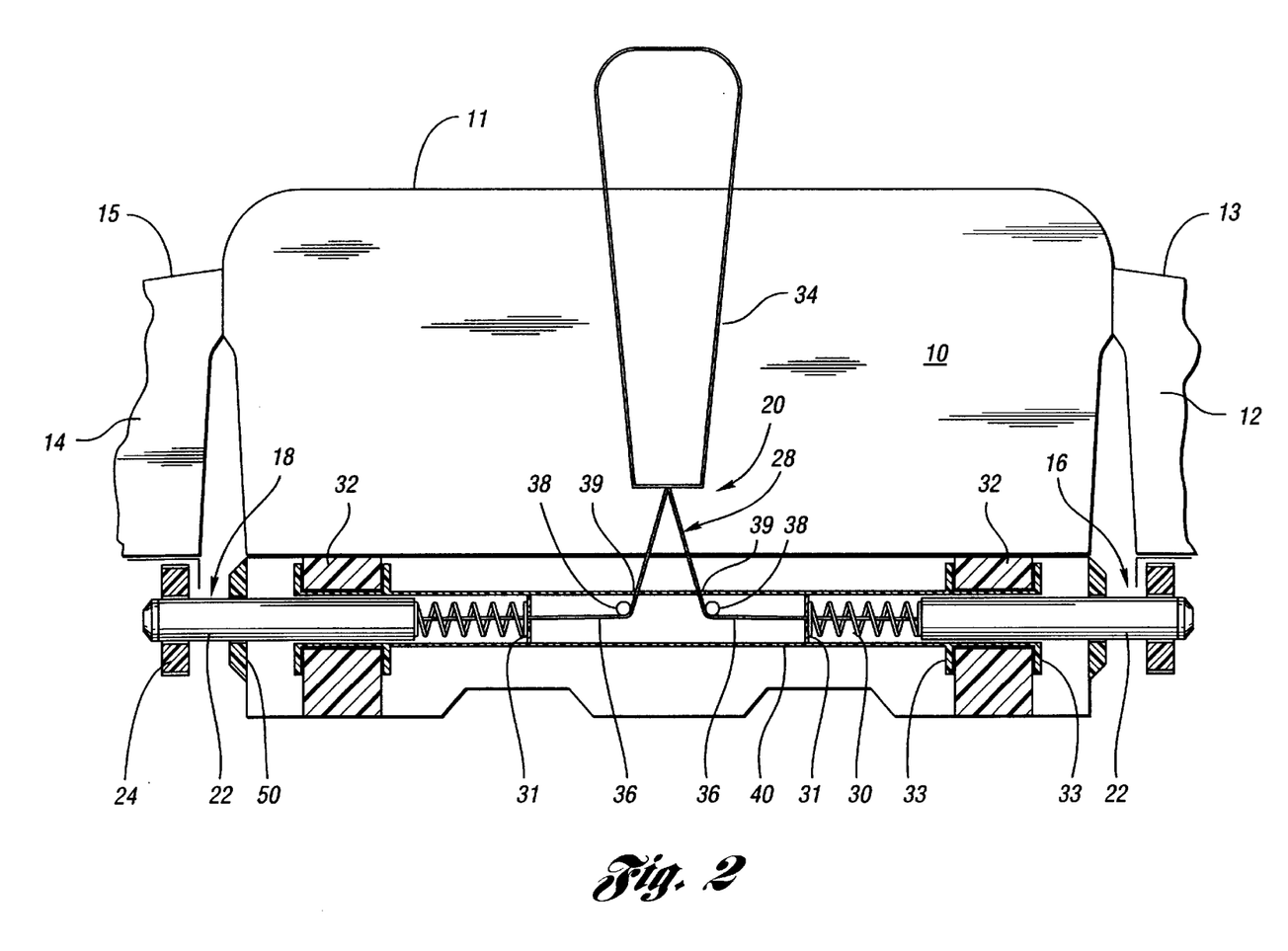
FIG. 2 is a drawing similar to FIG. 1, in which the locking bolts have left their rotationally locked position but still maintain their axially locked position in the bolt retainers.
Figure 3:
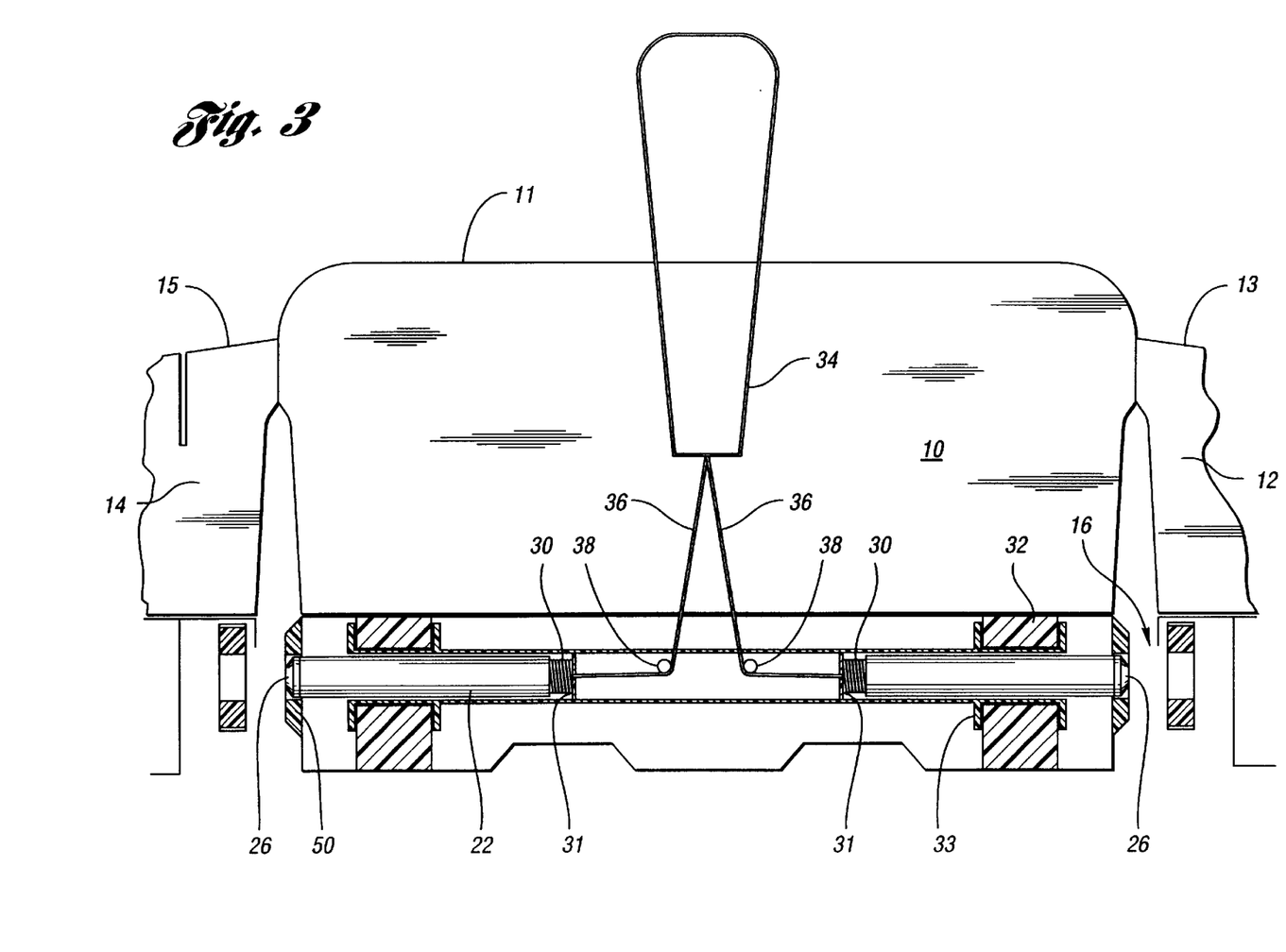
FIG. 3 is a drawing similar to FIG. 2, in which the locking bolts have been retracted into the unlocked position and the middle seat-back part is unlocked.

As shown in the cross-sectional diagrams of FIGS. 1 to 3 schematically, a seat back comprises a middle part 10 and two laterally adjacent outer parts 12 and 14. The contours identified by the reference numerals 11, 13 and 15 face into the interior of the vehicle and indicate the surface against which a passenger can lean. The width of the seat-back parts 10, 12 and 14 can be chosen arbitrarily. It is especially advantageous for the middle part 10 to occupy only about 20% of the total width of the seat back. Then, when the middle part 10 is folded down into a flat transport position, a space is available in which a long piece of luggage can be placed by passing it through the back door of the vehicle. At the same time there are still available two seats with broad outer back parts 12 and 14, where people can sit comfortably.

The seat-back parts 10, 12 and 14 in their lower regions are hinged to the body of the vehicle in the customary way (not shown) and prepared for being folded down into a flat transport position. The customary detention mechanisms, for example in the form of rotary latch mechanisms, are provided on the outer sides of the outer seat-back parts 12 and 14 in the region of the vehicle body, to lock these parts in position and unlock them; these mechanisms are of the conventional construction and for this reason are not shown.

As indicated schematically in FIG. 1, the middle seat-back part 10 comprises a pair of locking bolts 22 which, when the back part is in the upright, seat position, are in form-fitting engagement with bolt retainers 24 in the two adjacent outer seat-back parts 12 and 14 and in this way form locking mechanisms 16 and 18. In the arrangement according to FIG. 1 it can be seen that each locking bolt 22 is provided with a head 26, that advantageously has a cross section that is other than round, for example is elliptical, and when in the locked position engages the outer wall of the associated bolt retainer 24 in a form-fitting manner. In a simplified, not illustrated embodiment the locking bolt 22 is constructed without a head and projects axially outward through the aperture in the bolt retainer 24, in order to form the locking mechanism 16 or 18.

An actuating mechanism 20 comprises a pair of compression springs 30, each of which is braced at one end against the inner surface of a locking bolt 22 and at the other end against an abutment 31, so that the locking bolt 22 in its locked position is pressed axially outward.

Figure 4:
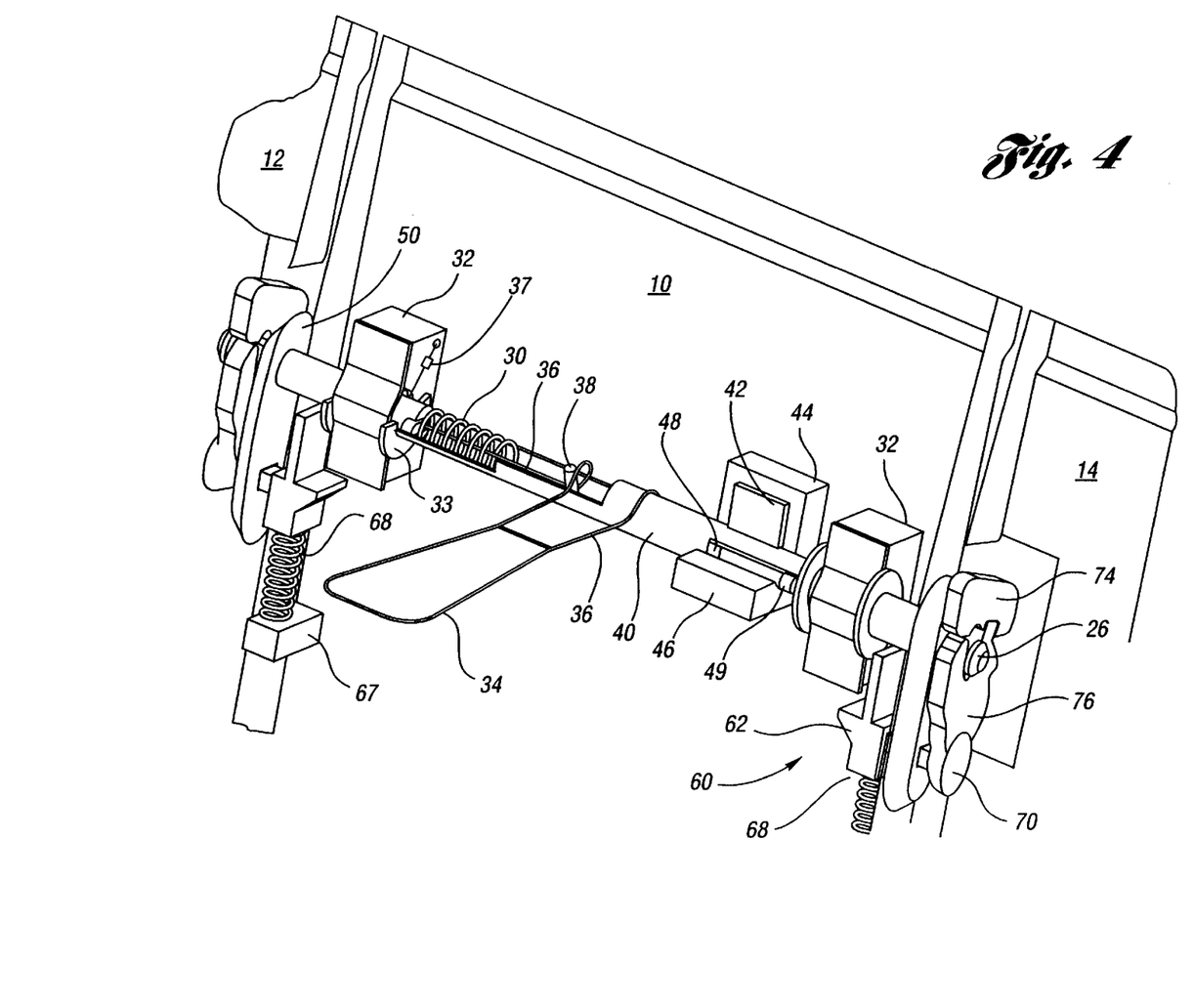
FIG. 4 shows a perspective side view of a cross section of a seat back in the direction of the arrow A in FIG. 1, to explain the rotationally locked position.
Figure 9:
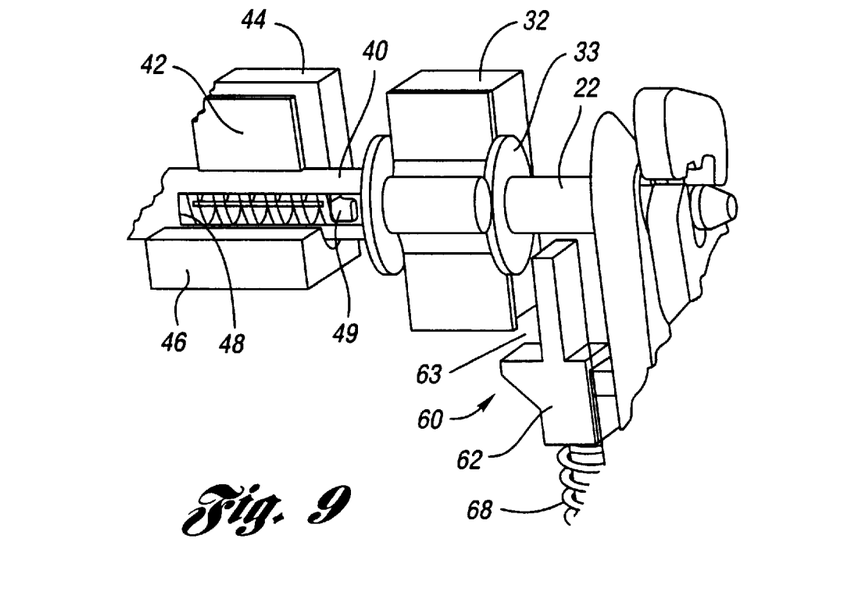
FIG. 9 is a perspective drawing corresponding to FIG. 8, showing individual components in the region of the detention mechanism.
Figure 10:
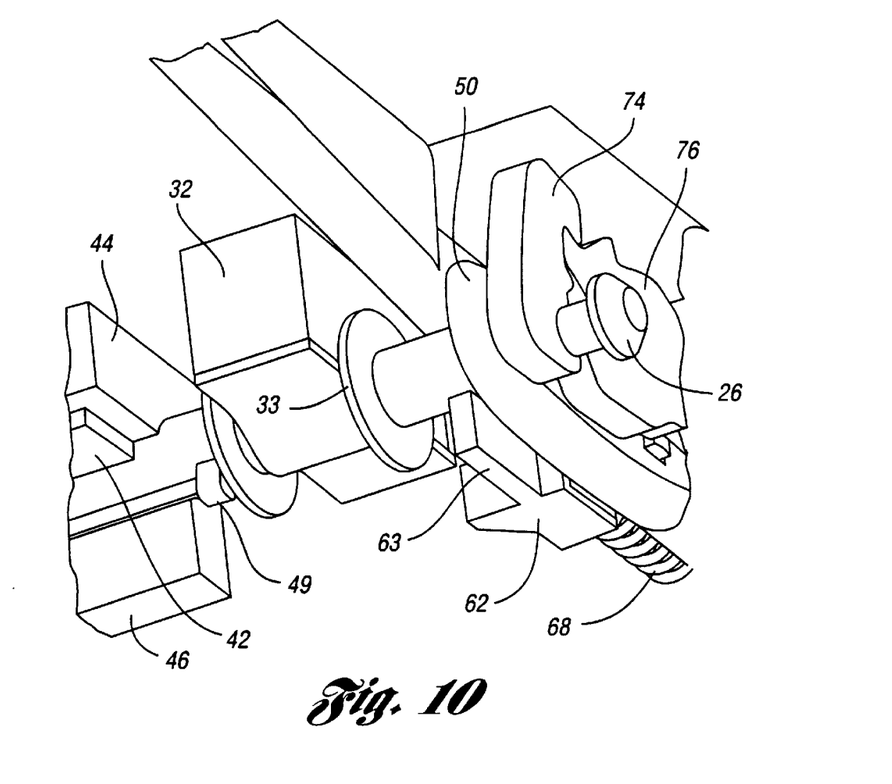
FIG. 10 is a drawing similar to FIGS. 8 and 9, which shows the arrangement from a somewhat different perspective.
Figure 11:
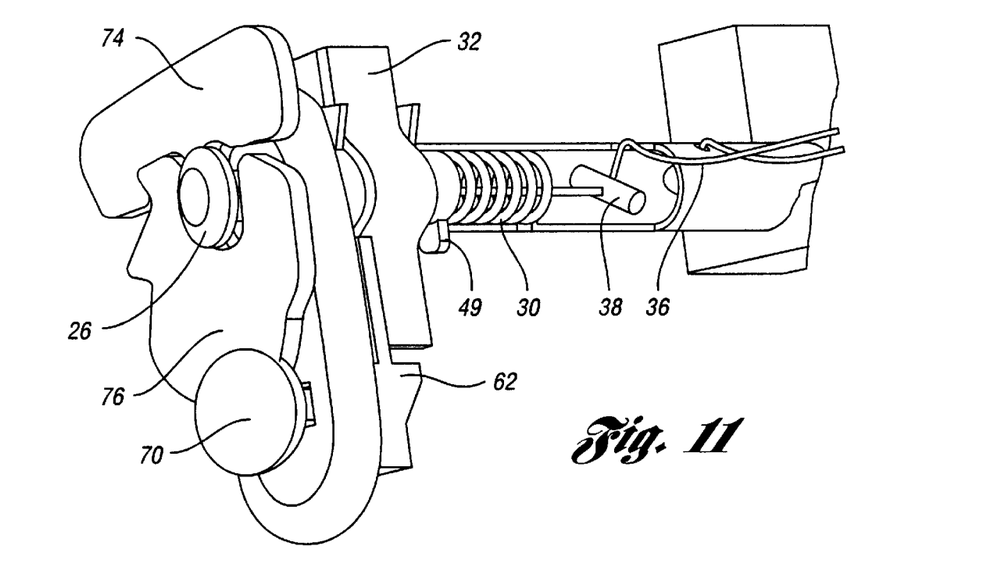
FIG. 11 is a perspective drawing that corresponds to the situation according to FIG. 5, in which the locking bolt has left its rotationally locked position.
Figure 12:
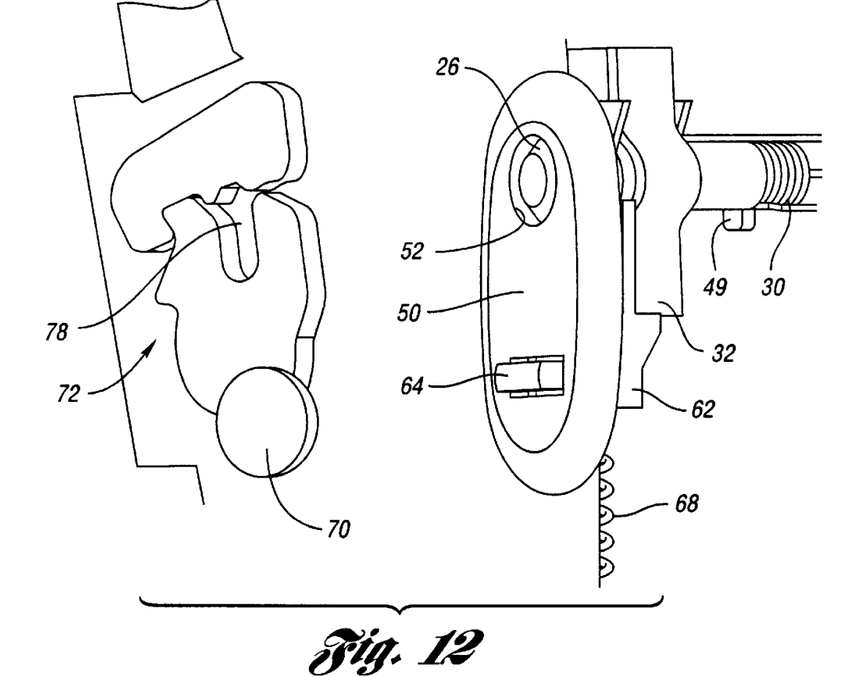
FIG. 12 is a perspective drawing that corresponds to the situation according to FIGS. 3 and 6, in which the locking bolt has left its locked position and been retracted.
Figure 13:
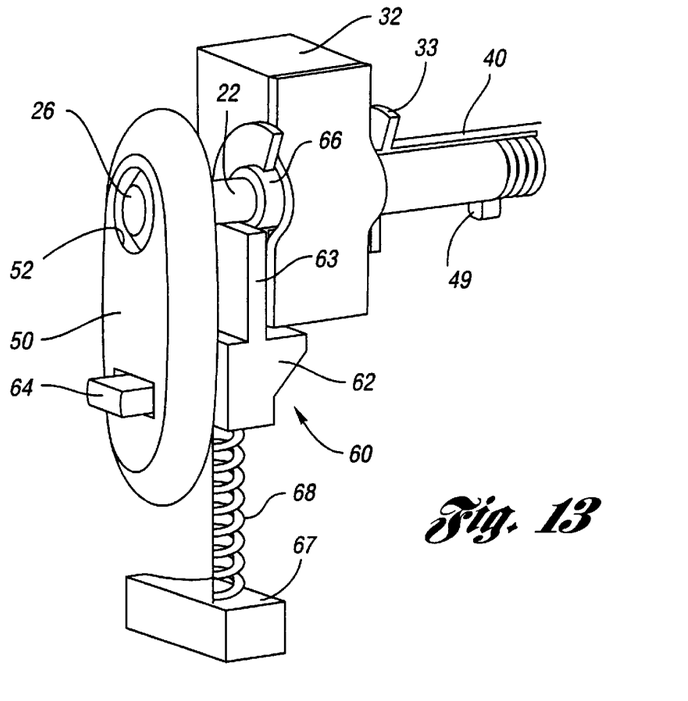
FIG. 13 is a drawing similar to FIG. 12, which shows the locking bolt in its retracted position and the detention mechanism in its detention position.
Figure 14:
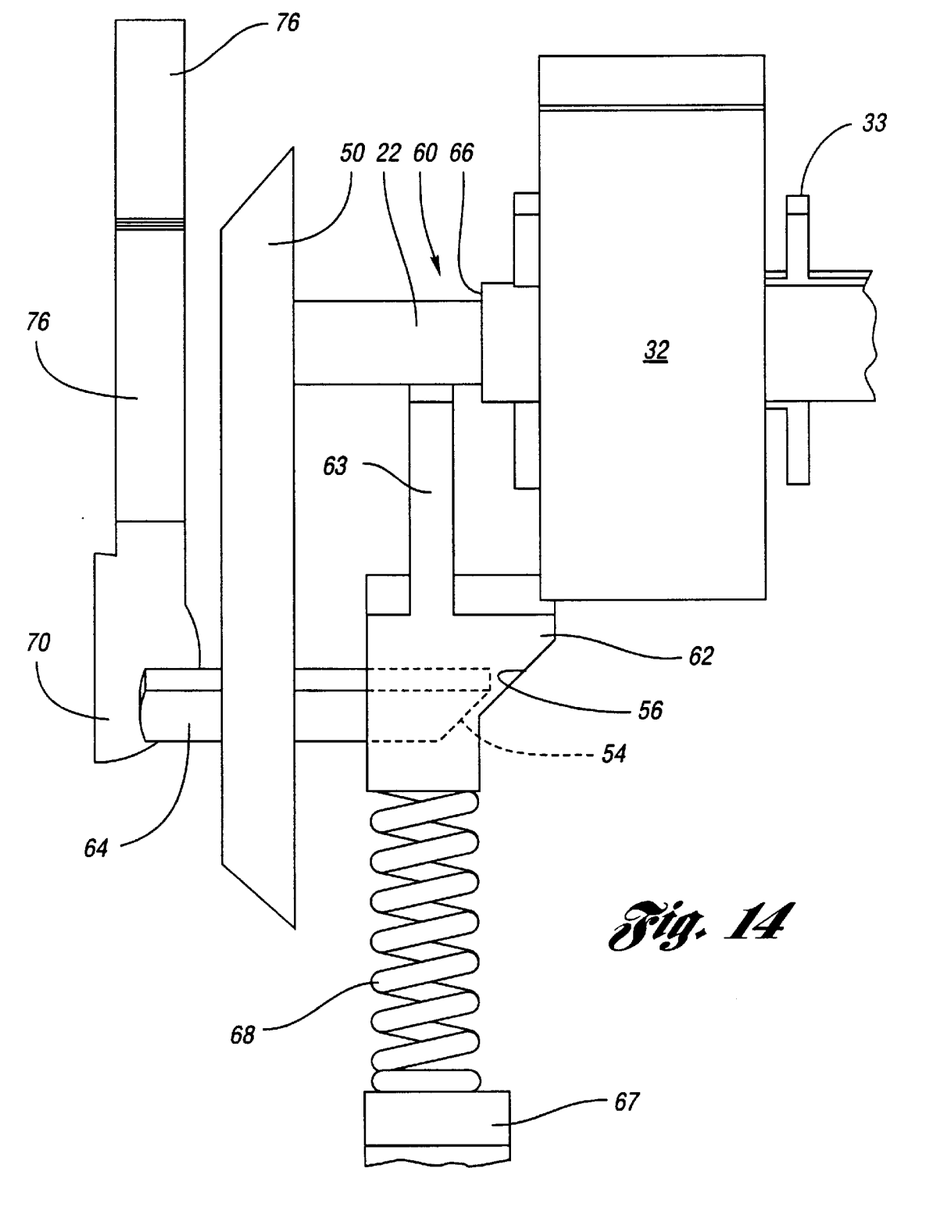
FIG. 14 is a side view corresponding to FIG. 13, to explain the arrangement of the components when the detention mechanism is in the detention position.

Both the locking bolts 22 and the compression springs 30 are so disposed within a guide tube 40 that they can be axially displaced but not rotated. For this purpose the locking bolts 22 are provided with guide pins 49, which rest in guide tracks 48 in the guide tube 40. Details of this arrangement can be seen in the drawings of FIGS. 4 and 9, where the guide track 48 is exemplarily constructed as a slot.

Figure 5:
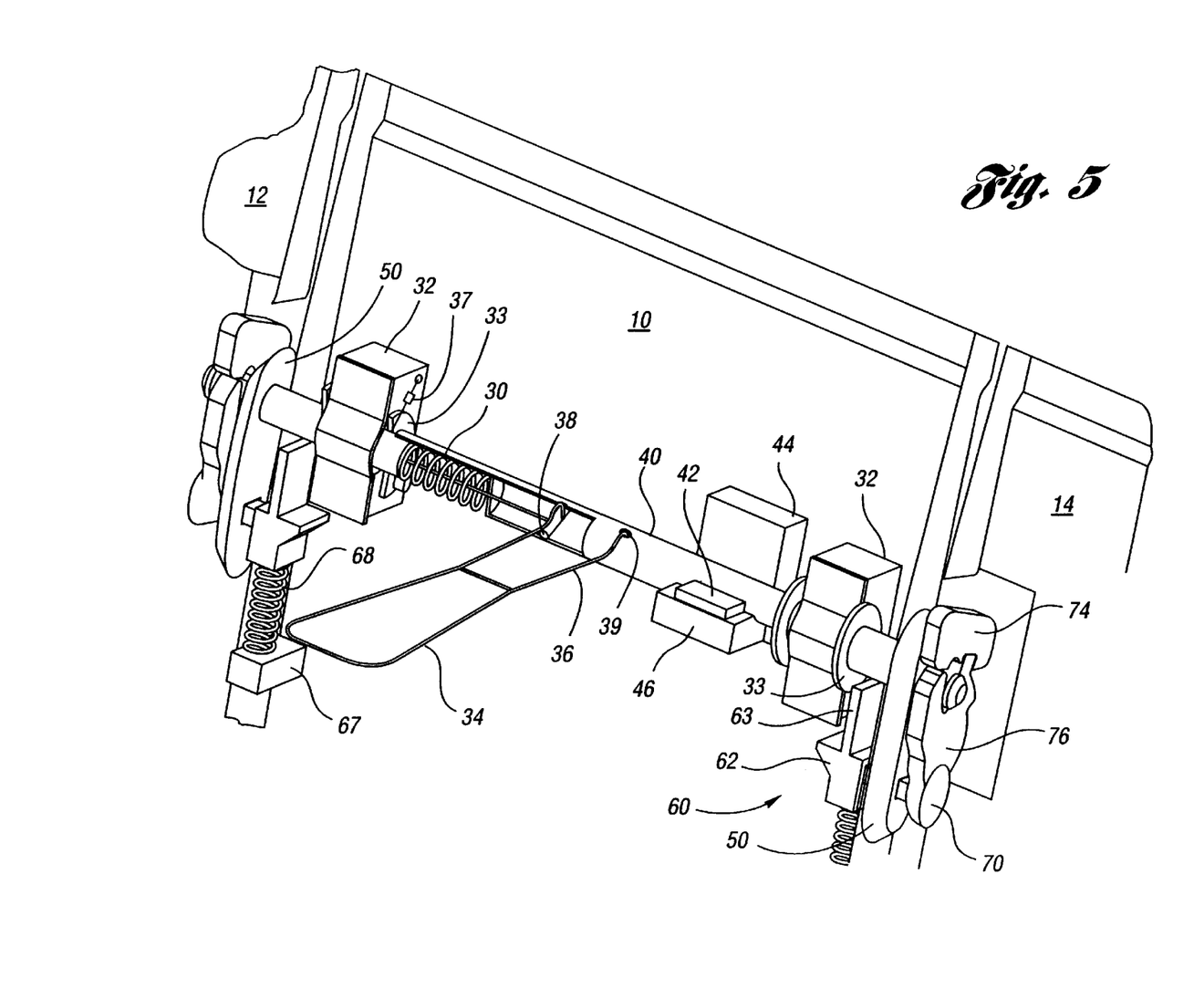
FIG. 5 is a drawing similar to FIG. 4 to explain the situation according to FIG. 2, in which the locking bolts have left their rotationally locked position.
Figure 6:
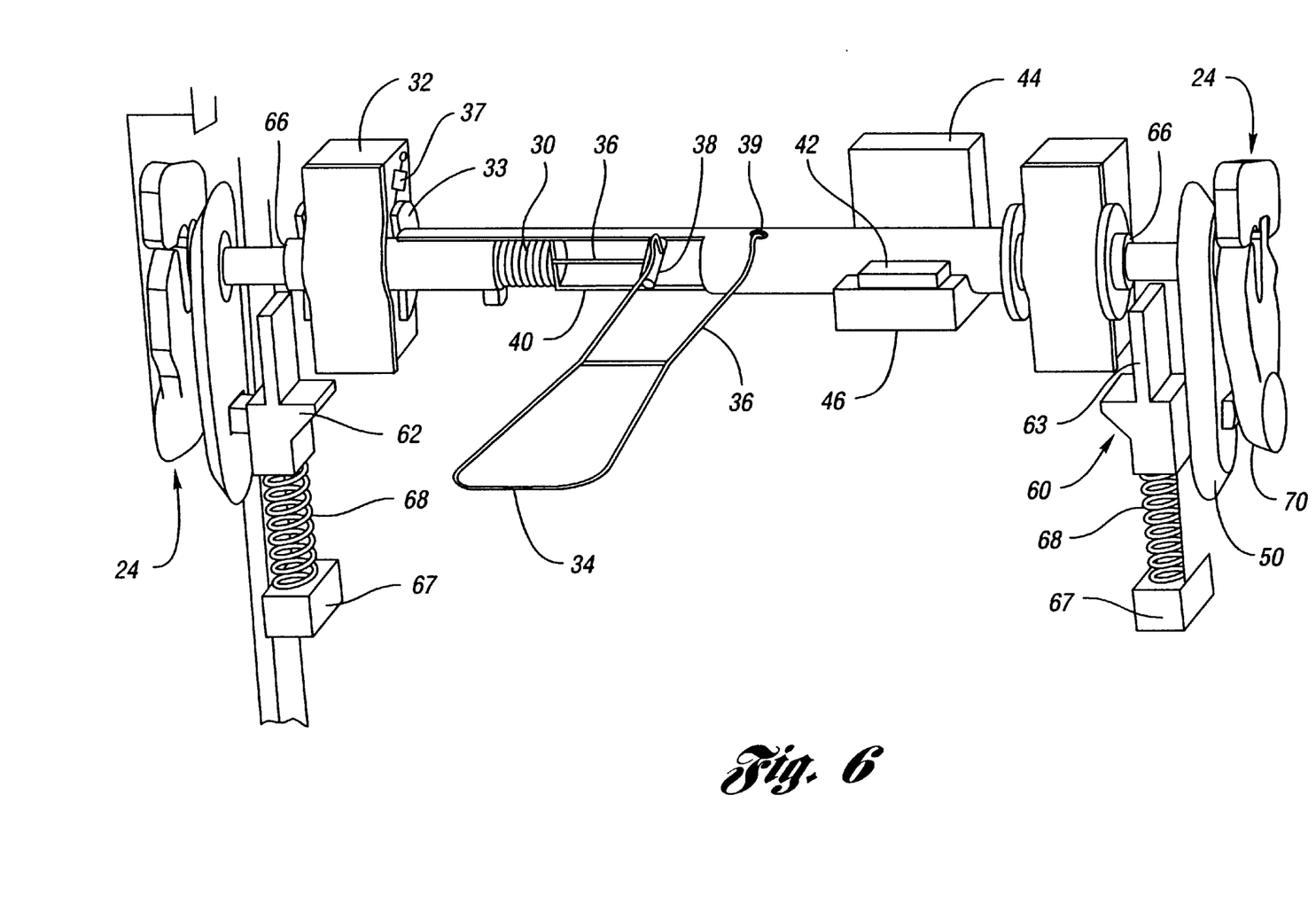
FIG. 6 is a drawing similar to FIGS. 4 and 5 to explain the situation according to FIG. 3, in which the locking bolts have left the bolt retainers and been retracted.

The guide tube 40 in turn is rotatably mounted in bearings 32 and provided, e.g., with bearing disks 33 so that it cannot be displaced axially. So that the guide tube 40 can occupy specified final abutment positions, the guide tube is provided on its outer surface with a projection 42, advantageously made integral with the tube, which can be brought into engagement with two stops 44 and 46 that are spaced apart by a certain angle, for example 90°. These elements are so arranged that the projection 42 of the guide tube 40 engages the stop 44 in the locked position, whereas in the unlocked position it rests against the stop 46 (see FIGS. 4 and 5).

At its axially outer ends, the actuating mechanism is closed off by a pair of plates 50, each with a central aperture that receives the head 26 of the associated locking bolt 22 when it is in the unlocked position, as will be described in detail below. The middle seat-back part 10 is unlocked by means of an unlocking operating cable 28, indicated schematically here, which comprises a pair of traction cables 36 that are attached to the axially inner ends of the two locking bolts 22 and are connected to a common pull-strap 34. From the inner ends of the locking bolts 22 the two traction cables 36 initially run axially towards the interior, then pass around deflection elements 38, emerge from the guide tube 40 through separate openings 39 in its wall and continue to their connection with the pull-strap 34.

In addition there is provided a turning device, which turns the two locking bolts 22 through a predetermined angle of rotation to put them into a rotationally locked position. In one embodiment the turning device can comprise a second pair of springs 37, which may take the form of compression, tension or torsion springs; these exert torque on the locking bolts 22 so that the latter are turned about their longitudinal axis into the rotationally locked position. In FIGS. 4 to 7 such a spring 37 is shown schematically.

Another embodiment of the turning device, not illustrated here, can comprise a cross-pin on each locking bolt 22 and an associated gate with an angled guide track for the cross-pin, such that as the locking bolt 22 is being driven out into its locked position its movement is initially translation and subsequently rotation into the rotationally locked position. Although such an embodiment functions with no need to employ additional springs in the turning device, when the locking bolt 22 is disengaged by turning it out of the rotationally locked position, a translational inward movement of the locking bolt 22 is usually superimposed on the turning movement, so that the head 26 of the locking bolt 22 needs to be allowed a degree of axial clearance with respect to its bolt retainer 24.

As shown in FIGS. 4 to 14, at the outer end of each locking bolt 22 there is provided a detention mechanism 60, which serves to keep the locking bolt 22 in its retracted, unlocked position until the associated bolt retainer 24 in the adjacent outer seat-back part 12 or 14 is (again) directly opposite the locking bolt 22. This detention mechanism functions only when the locking bolt 22 is in its retracted, unlocked position. When the locking bolt 22 has moved into its locked position, the detention mechanism 60 is inactive, having moved away into its resting position.

For this purpose, the detention mechanism 60 comprises a securing device 62 with a radially protruding projection 63 which is biassed transversely toward the locking bolt 22 by means of a compression spring 68 that is braced against an abutment 67.

Associated with the securing device 62 is a movable control peg 64, which is advantageously mounted in the above-mentioned plate 50 so as to be axially displaceable to a limited extent but not rotatable. The control peg 64 extends into the body of the securing device 62 and is slanted at its end to form a control surface 54, which cooperates with a control surface 56, slanted at a complementary angle, in the interior of the securing device 62.

When the control peg 64 is inserted into the securing device 62, the latter is pushed downward against the action of the spring 68 and thus moved into its disengaged position. But when the control peg 64 is withdrawn from the securing device 62, the spring 68 presses the securing device 62 upward, in a radial direction with respect to the locking bolt 22, so that its projection 63 is brought into form-fitting, locking engagement with a stop 66 of the associated locking bolt.

Such a stop 66 on the locking bolt 22 can, for example, take the form of a ring projecting radially outward, or a groove or undercut in the locking bolt 22, or be constructed in some other way that allows the desired detaining action to be exerted on the locking bolt 22 when the bolt has been brought into its retracted, unlocked position. It is advantageous for the head 26 of the relevant locking bolt 22 simultaneously to be received in an associated aperture 52 of the plate 50, which advantageously has a shape complementary to that of the head 26 and holds the latter firmly in a form-fitting manner.

In the simplest case the bolt retainers 24 are constructed as stable plates, which are attached to the sides of the outer seat-back parts 12 and 14 and which include an aperture with a shape complementary to that of the head 26 of the locking bolt 22. These bolt retainers 24 advantageously incorporate a control body or cam 70, which is provided to cooperate with the control peg 64. In the embodiment according to FIGS. 4 to 14 the bolt retainers 24 are conveniently constructed as rotary latch mechanisms 72 of the kind known per se, which comprise a rotary latch 76 and an associated pawl 74; the control body or cam 70 is advantageously made integral with the latch 76.

The function of the actuating mechanism 20 and that of the associated detention mechanism 60 are described in detail in the following.

In the initial position, as shown in FIG. 1, both locking bolts 22 are extended and in their rotationally locked position, with their heads 26 engaging the bolt retainers 24 in a form-fitting manner. The compression springs 30 are under very little tension, and the unlocking operating cable 28 is not actuated. This situation is also shown in FIG. 4 and FIGS. 8 to 10, in which the head 26 of the locking bolt 22 is seated against the outer surface of the bolt retainer 24 across its aperture 78.

In this situation the middle seat-back part 10 is firmly locked to the two laterally adjacent, outer seat-back parts 12 and 14 and can, for example, be in an upright, seat position.

When outer locking mechanisms on the outer seat-back parts 12, 14 are disengaged, the middle part can be folded down together with the two outer parts into a flat transport position, all three parts 10, 12 and 14 in this case forming an integral unit.

To unlock the middle seat-back part 10 the unlocking operating cable 28 is actuated by pulling on the pull-strap 34, as indicated in FIG. 2. Further details can be seen in FIGS. 5 and 11. As shown there, the locking bolts 22 are rotated by a predetermined angle to turn them out of the rotationally locked position, so that the heads 26 are no longer in form-fitting engagement with the outer walls of the bolt retainers 24 but instead are aligned with the corresponding apertures 78, so that they can be retracted into the interior of the guide tube 40. It can further be seen that the projection 42 on the guide tube 40 is no longer abutting the stop 44 but now, because of the rotation of the guide tube 40, rests against the stop 46 (see FIG. 5).

This is achieved by disposing the openings 39 through which the traction cable 36 passes at a place in the guide tube 40 such that in the initial (rotationally locked) position they face away from the pull-strap 34, so that when the unlocking operating cable 28 is actuated the first effect is a rotation of the guide tube and hence of the locking bolts 22 fixed therein, which turns the locking bolts 22 out of the rotationally locked position. The openings 39, which are concealed in FIG. 4, thus become visible in FIG. 5.

In the next phase, shown in FIG. 3, FIG. 6 and FIGS. 12 to 14, the unlocking operating cable 28 is pulled further out by means of the pull-strap 34, with the consequence that the locking bolts 22 are retracted into the interior of the guide tube 40. This occurs against the action of the compression springs 30, which are compressed between the inner ends of the locking bolts 22 and their abutments 31. The traction cables 36 are drawn past the deflecting elements 38 and outward through the openings 39. Finally the heads 26 of the locking bolts 22 are received in apertures 52 of the plates 50 and held there, advantageously in a form-fitting manner.

As long as there is no relative movement between the middle seat-back part 10 and one of the two laterally adjacent, outer seat-back parts 12 or 14, the detention mechanism 60 remains in its disengaged, resting position, because the control body or cam 70 presses against the control peg 64, which in turn immobilizes the securing device 62 of the detention mechanism 60.

Figure 7:
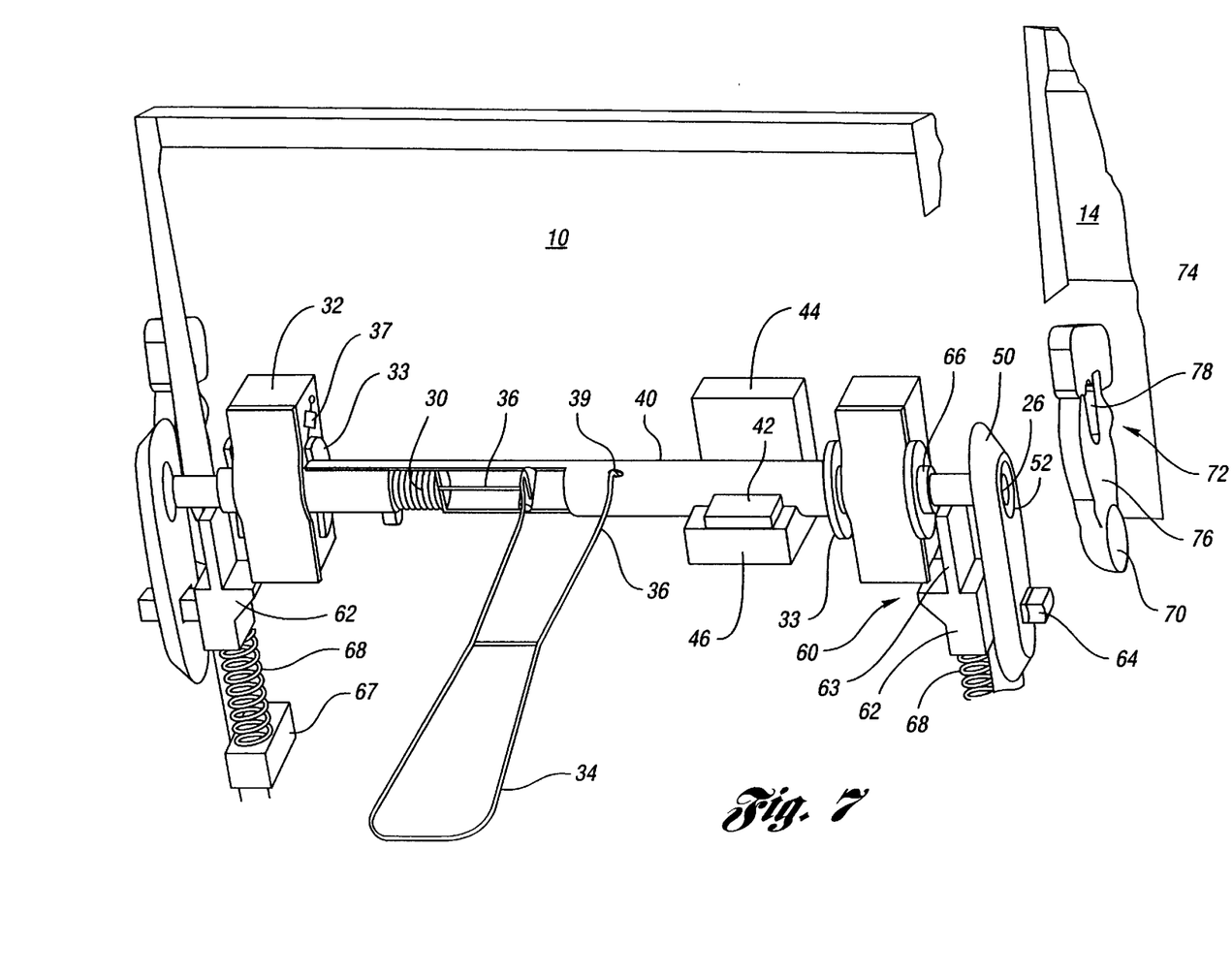
FIG. 7 is a drawing similar to FIG. 6, in which the middle seat-back part is unlocked and tilted slightly forward.
Figure 8:
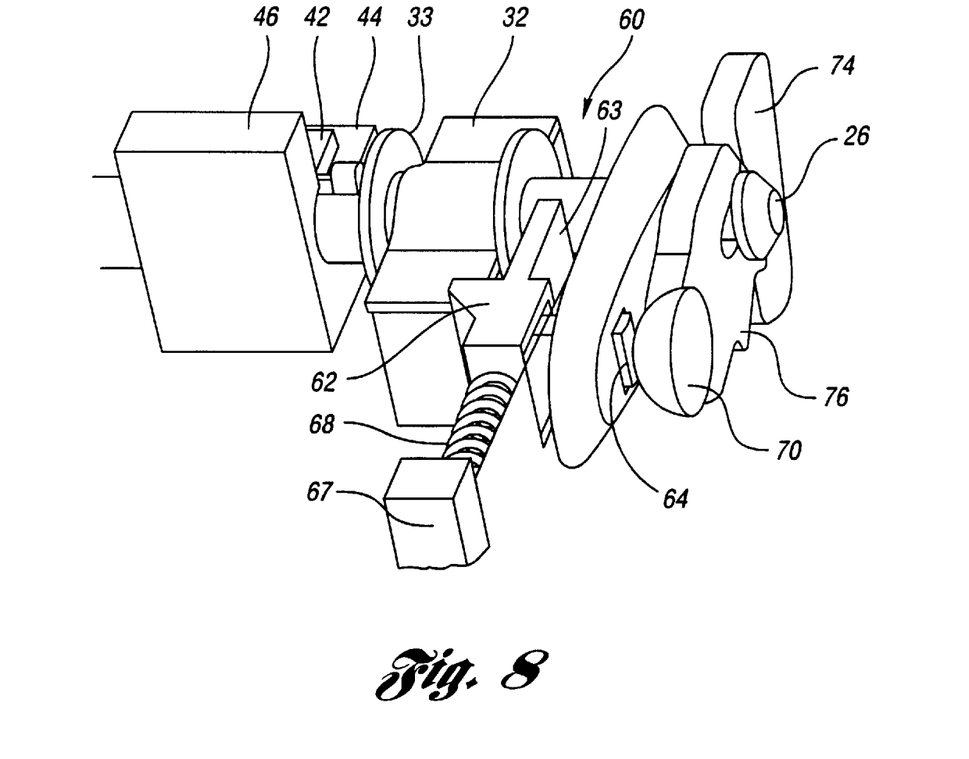
FIG. 8 is a detail drawing corresponding to FIG. 4, which shows the locking bolt in its rotationally locked position.

It is only when there has been a relative movement between the middle seat-back part 10 and, for instance, the outer part 14, as shown in FIG. 7, that the control peg 64 becomes free to move; as a result, the compression spring 68 can now push the securing device 62 with its projection 63 upward and press the latter radially against the locking bolt 22, so that the projection 63 comes into form-fitting engagement with the stop 66 of the locking bolt 22 and prevents any displacement of the locking bolt 22 axially outward. This situation is particularly clearly shown in FIGS. 12 to 14.

The surfaces of the control body or cam 70 and the associated control peg 64 that contact one another are advantageously rounded, to make it easier for them to slide over one another. This is indicated schematically, for example, in FIGS. 5 to 8.

In the unlocked position, shown in FIG. 3, several options are possible: the middle seat-back part 10 can be folded down into a flat transport position, or one of the laterally adjacent outer seat-back parts 12 or 14 can be folded down into the flat transport position after an outer locking mechanism in the outer part 12 or 14 has been disengaged.

When the middle seat-back part 10 has been folded down into the flat transport position, both locking bolts 22 remain in their retracted position in the interior of the guide tube 40, even after the unlocking operating cable 28 has been released. This is ensured by the detaining action of the two detention mechanisms 60, which prevent axial emergence of the locking bolts 22, so that their heads 26 remain in the associated plates 50.

On the other hand, when one laterally adjacent, outer seat-back part is folded down into the flat transport position and subsequently the unlocking operating cable 28 in the middle part is released, the following occurs:

On the side of the middle part next to the folded-down part, for instance the outer part 12, the locking bolt 22 remains in its retracted position in the guide tube 40, because it is held there by the associated detention mechanism 60. On the side next to the other outer part 14, in contrast, because the position of this seat-back part has not changed, the control body 70 is pressing against the control peg 64 and thereby keeping the securing device 62 in its disengaged, resting position. When the unlocking operating cable 28 is released, therefore, the locking bolt 22 on this side is moved axially outward by the action of the compression spring 30, so that it occupies the locked position shown in FIG. 2. Hence the middle seat-back part 10 and the upright outer seat-back part 14 again form a locked-together, integral unit that is stable against the action of external forces.

When the folded-down outer seat-back part, in this case the part 12, is subsequently raised back into the seat position, the now upright outer part 12 is automatically locked to the middle part 10.

This locking engagement is brought about with no actuation of the unlocking operating cable, because as the outer seat-back part is raised, the control body 70 slides over the outer end of the control peg 64 and pushes the control peg 64 in the axial direction, into the securing device 62. By way of the cooperation of the slanting surfaces 54 and 56 of the control peg 64 and securing device 62, the securing device 62 is pushed downward against the action of the spring 68, so that it moves radially away from the locking bolt 22, with the consequence that the stop 66 on the locking bolt 22 is released.

Accordingly, the spring 30, which is still compressed, presses the locking bolt 22 axially outward, out of the plate 50 and into the bolt retainer 24, which is now aligned with the aperture 52 in the plate 50. Then the turning device, for example in the form of the spring 37, turns both locking bolts 22 into their rotationally locked position, in which the head 26 is once again in form-fitting engagement with the outer wall of its associated bolt retainer 24.

Obviously, the outer seat-back parts 12 and 14 can also each individually be folded down into the flat transport position by disengaging their individual rotary latch mechanisms 72, without actuating the unlocking mechanism 28. Then whichever of the seat-back parts 12 and 14 is not folded down remains firmly locked to the middle part 10, because the locking bolt 22 on that side is still in its rotationally locked position, engaging the associated bolt retainer 24.

It is evident that the locking and unlocking mechanisms of the middle seat-back part 10 can be actuated in a simple manner, so that when required it is necessary merely to operate the unlocking operating cable 28 by means of the pull-strap 34. Although the reversible or hinged seat back is thus simple and convenient to use, it provides a high degree of safety when the seat-back parts are in their upright, seat position.

The actuating mechanism 20 described above can of course also find applicaton in a seat back that is constructed as a single piece throughout, if at its outer ends, with respect to the width of the vehicle, appropriate bolt retainers 24 are provided in the body of the vehicle. Then the seat back can be unlocked in a corresponding manner, by means of a central handle.

We claim:

1. Reversible back for a bench seat, in particular for a rear seat of a vehicle, wherein parts of the seat back can be folded down into a flat transport position and raised into an upright seat position individually and independently of one another;

characterized in that a middle seat-back part (10) is provided, which can selectively be folded down either together with one or both of the laterally adjacent, outer seatback parts (12, 14) or independently of the two outer seat-back parts (12, 14), as desired;

the middle seat-back part (10) can be locked at each of its sides individually to the two outer seat-back parts (12, 14); and the middle seat-back part (10) comprises a central actuating mechanism (20) with which locking mechanisms (16, 18) on both sides can be disengaged or engaged jointly and simultaneously;

characterized in that the actuating mechanism (20) comprises a first pair of compression springs, which bias a pair of locking bolts outward into a locked position, and a turning device that turns the locking bolts through a predetermined angle of rotation into a rotationally locked position.

2. Seat back according to claim 1, characterized in that the actuating mechanism (20) comprises the pair of locking bolts (22) that in the locked position are biased to, and engage in a form-fitting manner, complementary bolt retainers (24) in the two outer seat-back parts (12, 14) and also the turning device comprises an unlocking operating cable (28) with which both locking bolts (22) can be retracted simultaneously out of the bolt retainers (24) into an unlocked position.

3. Seat back according to claim 2, characterized in that each locking bolt (22) comprises a head (26) with a cross section other than round, which in the locked position is in form-fitting engagement with a wall of the associated bolt retainer (24).

4. Seat back according to claim 2, characterized in that the unlocking operating cable (28) comprises a central pull-strap (34) as well as one traction cable (36) for each locking bolt (22), and in that when the unlocking operating cable (28) is actuated, first a head (26) of each locking bolt (22) is turned out of its rotationally locked position and then each locking bolt (22) is retracted out of its bolt retainer (24).

5. Seat back according to claim 2, characterized in that there is associated with an outer end of each locking bolt (22) a detention mechanism (60), which keeps the locking bolt (22) fixed in its retracted, unlocked position until the associated bolt retainer (24) in the adjacent outer seat-back parts (12, 14) is directly opposite the locking bolt (22).

6. Seat back according to claim 5 characterized in that the detention mechanism (60) comprises a securing device (62) disposed transverse to the locking bolt (22), which is biassed toward its detaining position in a direction transverse to the locking bolt (22), and a movable control peg (64) in order to activate the securing device (62) toward the detaining position, and disengage it into its resting position, respectively.

7. Seat back according to claim 6, characterized in that the locking bolt (22) comprises at an axial distance from its head (26) a stop (66) that can be brought into detaining engagement with a radial projection (63) of the securing device (62).

8. Seat back according to claim 6, characterized in that the control peg (64) can be displaced to a limited extent in its longitudinal direction but is nonrotatably mounted and in that the control peg (64) comprises a slanted control surface to activate or disengage the securing device (62).

9. Seat back according to claim 6, characterized in that each bolt retainer (24) comprises a control body (70) that is associated with the control peg (64), such that when the control body (70) is in a first relative position it actuates the control peg (64) so as to cause the securing device (62) to be disengaged and in a second relative position allows the control peg (64) to activate the securing device (62).

10. Seat back according to claim 2, characterized in that each bolt retainer (24) is constructed as a rotary latch mechanism (72), between a latch (76) and pawl (74) of the rotary latch mechanism is formed an aperture having a contour complementary to that of the head (26) of the locking bolt (22).

11. Seat back according to claim 1, characterized in that the turning device comprises a second pair of springs (37) that exert torque on the locking bolts (22) and bias the locking bolts (22) around the longitudinal axis thereof forward their rotationally locked position.

12. Seat back according to claim 1, characterized in that the turning device comprises a cross-pin on each locking bolt (22) and an associated gate with an angled guide track for the cross-pin, such that as the locking bolt (22) is being pushed out into the locked position its movement is first a translation and then a rotation into the rotationally locked position.

13. Seat back according to claim 1, characterized in that a guide tube (40) is provided, which accommodates the two locking bolts (22) as well as the compression springs (30) associated therewith, and in that the guide tube (40) is mounted in bearings (32) such that it cannot be axially displaced but can be rotated through a predetermined angle.

14. Seat back according to claim 13, characterized in that the guide tube (40) comprises a guide track (48) for a guide pin (49) on each locking bolt (22), such that the locking bolt (22) is supported and can be displaced axially but cannot be turned radially within the guide tube (40).

15. Seat back according to claim 13, characterized in that the guide tube (40) comprises in its interior deflecting elements (38) with each of which is associated a through opening (39) in the wall of the guide tube (40) through which the corresponding traction cable (36) passes, such that a traction cable (36) extending from the locking bolt (22) first runs substantially axially within the guide tube (40) and then emerges transversely therefrom, and in the rotationally locked position passes at least partially around the circumference of the guide tube (40) to the turning device.

16. Seat back according to claim 13, characterized in that the guide tube (40) comprises a projection (42) extending radially outward as well as two associated stops (44) spaced apart from one another in the circumferential direction, which limit the angle of rotation of the guide tube (40) and simultaneously define final abutment positions that determine the locked and unlocked positions, respectively, of each locking bolt (22).

17. Seat back according to claim 1, characterized in that there is associated with an the outer end of each locking bolt (22) a stationary plate (50) with an aperture (52), the shape of which is complementary to the shape of a the head (26) of the locking bolt (22) and which in the unlocked position of the locking bolt (22) receives the head (26).

* * * * *

UNITED STATES PATENT AND TRADEMARK OFFICE
CERTIFICATE OF CORRECTION

PATENT NO. : 6,012,776
DATED : January 11, 2000
INVENTOR(S) : Schneider, et al

It is certified that error appears in the above-identified patent and that said Letters Patent is hereby corrected as shown below:

Column 12, Line 14, Claim 15: after "which" delete "the" and insert --a--.

Column 12, Line 15, Claim 15: before "traction" delete "a" and insert --the--.

Signed and Sealed this

Seventeenth Day of October, 2000

Attest:

Q. TODD DICKINSON

*Attesting Officer*    *Director of Patents and Trademarks*